Nov. 24, 1936.　　　E. R. DOUGLAS ET AL　　　2,062,257
TUBULAR SAW
Filed Dec. 18, 1934
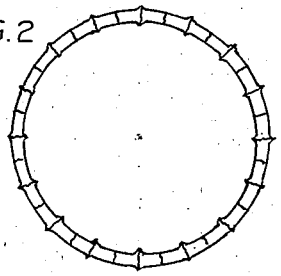
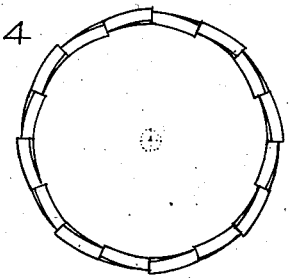
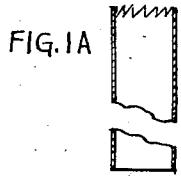
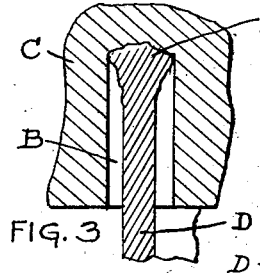
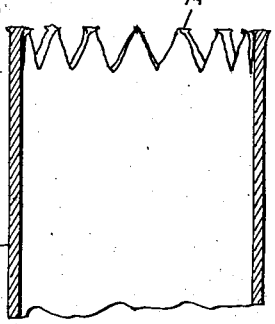
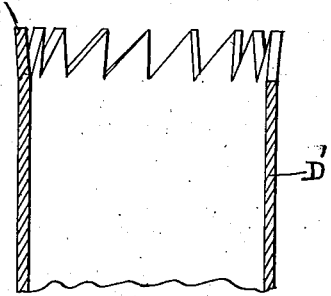
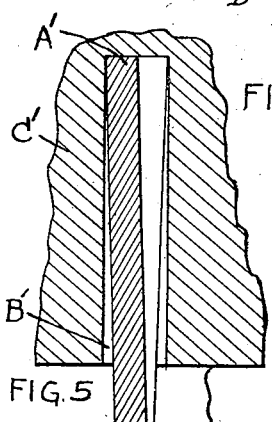
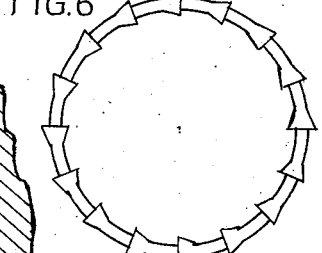
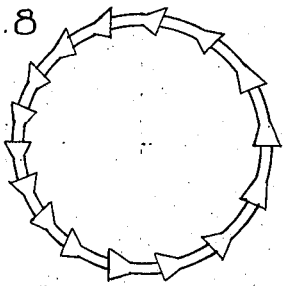
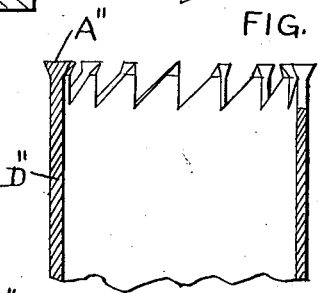
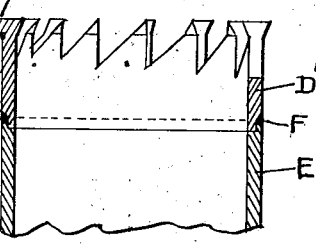
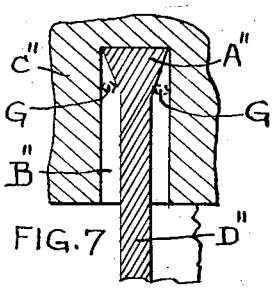
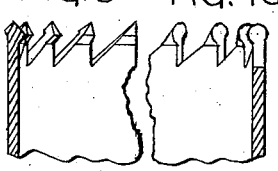
INVENTORS
JOHN J. HEINS, JR.
ALEXANDER EDEL
EDWIN R. DOUGLAS
BY
ATTORNEY Patented Nov. 24, 1936

2,062,257

UNITED STATES PATENT OFFICE 2,062,257

TUBULAR SAW

Edwin R. Douglas, Baltimore, Md., and John J. Heins, Jr., and Alexander Edel, Philadelphia, Pa., assignors to Harry Barker, Montclair, N. J.

Application December 18, 1934, Serial No. 758,086

5 Claims. (Cl. 143—85)

This invention relates to an improved form of tubular saw for cutting circular blanks out of any material, as, for example, button blanks out of pearl shell.

Heretofore, the common practice has been to make saws for this purpose by filing teeth in the ends of circular steel tubes, tempered soft enough so they could be filed. These tubes may either be seamless or bent up out of sheet steel. In either case they are held firm and true in rapidly rotating chucks, and means are provided for bringing them forcibly against the material to be cut, which is supported by a suitable rest, and often held thereon in the hand while the blanks are being cut.

An object of the present invention is to improve saws of this character.

A feature of the invention whereby the foregoing object is attained resides in constructing the saw in such a manner that the cutting edges of the teeth are wider than the normal thickness of the wall of the tube in which the teeth are formed, thus forming teeth which are widest at their cutting edge, and which taper rapidly toward their root.

The invention will be understood from the following description when read in connection with the accompanying drawing, Figs. 1 and 1A showing an end and longitudinal section respectively of a saw commonly used, which is constructed by filing teeth in the end of a circular steel tube.

Fig. 2 shows an end view and Fig. 2A shows a longitudinal cross section of the same saw constructed as shown in Fig. 1, but drawn to a larger scale, to show the irregularities commonly resulting from forming such saw teeth with a three-cornered file.

Fig. 3 shows the cutting edge of one of the teeth of the saw of Figs. 1 and 2, but drawn to a still larger scale, within the groove cut by it in a piece of material.

Fig. 4 shows an enlarged view of the end and Fig. 4A shows a longitudinal section, of a saw having its alternate teeth "set" in and out as customarily done in hand saws.

Fig. 5 shows a still larger view of a tooth of the saw of Fig. 4, within its groove.

Fig. 6 shows an enlarged end view and Fig. 6A shows a longitudinal section of a saw according to the present invention in which the cutting edges of the teeth are wider than the normal thickness of the tube in which the teeth are regularly formed.

Fig. 7 shows an enlarged view of a tooth of the saw shown in Fig. 6. Figs. 8 and 8A are similar to Figs. 6 and 6A respectively, except that the teeth are unequally spaced. Fig. 9 shows an alternative form of the invention in which the cutting edge of the tooth is pointed instead of flat.

Fig. 10 shows a saw in which the cutting edges of the teeth are rounded or curved.

In Figs. 1 and 1A, which show an end view and longitudinal section of a saw commonly used heretofore, the process of filing leaves the teeth somewhat irregular in size and shape, and throws burrs on the inside and outside, particularly so at the points of the teeth. Under a magnifying glass such hand-filed teeth are seen to be very rough and irregular, with burrs projecting from the edges. These make the effective thickness of the saw a little greater than the thickness of the steel in which the teeth are filed, so that the groove or kerf cut in the material is wider than the tube wall, giving clearance inside and outside, allowing sawdust to escape and preventing excessive friction, binding, and heating.

Saws made in this way cannot be hardened, as at the high temperature required to harden the steel, the minute burrs formed by the file are decarbonized or burned off and the sharp edges are destroyed and cannot be replaced after the tool is hardened.

In Figs. 2 and 2A are shown an end view and longitudinal section of the cutting end of such a saw, to scale four times larger than Fig. 1. The form of teeth shown is that commonly resulting from use of a three-cornered file, and the roughness and burrs are indicated.

In Fig. 3 is shown the cutting end A of Fig. 2, enlarged to ten times the scale of Fig. 1. It is shown as within the groove B cut by it in a piece of material C. The clearance between tube-wall D and material C is plainly shown.

To produce saws by this process the tube must be soft enough to be filed. Due to this softness, the burrs soon wear off, and must be re-formed every fifteen minutes or thereabouts by hitting the points of the teeth with the file, and after a few repetitions of this, by taking the saw out and re-filing the teeth.

This short life of the cutting edges and burrs and the frequent redressing causes considerable loss of time.

Attempts have been made to produce a better tool by making the saws of a steel capable of being tempered very hard, and before hardening, "setting" the teeth alternately in and out in the manner customarily used with hand saws and other saws, and then hardening.

Figs. 4 and 4A show an enlarged end view and longitudinal section of the cutting end of such a saw, and Fig. 5 shows a still further enlarged section of the end A' of such a saw, as within the groove cut by it in material C'.

It has been found, however, that this form of saw does not give good results in cases where it is desired to cut material dry. The clearance between the teeth and the groove is very small, especially near the cutting point A', where it vanishes. Dust packs in this space and cannot escape, and causes excessive friction, binding and heating. For this reason the saws commonly used are similar to those shown in Figs. 2 and 3.

This invention discloses a new type of button saw, embodying a new combination of elements, such as to permit making a saw that will have adequate clearance and can be hardened very hard so as to have a long life between sharpenings.

This new form of saw has been found in practice to last two to three days without the necessity of sharpening, in contrast to the usual type of saw which must be "burred" every fifteen minutes and redressed complete every hour or two.

Moreover, this improved saw can be resharpened many times before it must be discarded. It thus has many advantages in use over the present forms.

This new form of tubular saw which it is desired to protect by Letters Patent, is shown in Figures 6, 7, 8, 9, and 10. In this each tooth is broadened at its point to give clearance, but quickly tapers down to the normal tube thickness below the point, as shown at A'', Fig. 7. Thus ample clearance is provided just below the tooth-points, the same as in Fig. 3, while the saw can be made of any type of steel that will give sufficient hardness to afford long life.

Moreover this saw can be hardened, for the teeth are regularly formed and can be sharpened after hardening by grinding or honing, not once only, but many times, so that the life of the tool is prolonged.

It is found that good results are obtained when the angles G, G between the sides of the taper at A'' and the sides of the groove cut in D'', are about 20 degrees, though this can be departed from somewhat, in either direction, or the angles or projections can be different on the inside and outside of the tube, or the tooth may have the projecting bevel on one side only, alternate teeth projecting inward and outward,—or the cutting edge of the teeth may be straight, curved or pointed—without departing from the essence of the invention.

Figs. 6 and 6A show end view and longitudinal section of a simple form of this improved saw. Figs. 8 and 8A show a saw embodying this invention, in which, to avoid chatter, the teeth are unequally spaced, and in which the cutting member D'', of more expensive steel, is short, and set into a shank-tube E of soft and less expensive steel, the two being joined at F, F, as by brazing, welding or otherwise.

Fig. 9 shows a saw embodying this invention in which the cutting edges of the teeth are pointed or diamond shaped and the projection of the cutting edges from the tube wall is greater on the inside than on the outside.

Fig. 10 shows a saw embodying this invention in which the cutting edges of the teeth are rounded or curved instead of angular as in Fig. 9.

Teeth of this improved form may be made by reaming and turning the tube to the desired contour before the teeth are cut, or by making a straight tube and upsetting or swaging the end of it, while at a forging heat, to the desired contour, or by cutting teeth in a straight tube and swaging each individual tooth, or by any other means.

What is claimed is:

1. A tubular saw in which the teeth are regularly formed, and wider at their cutting edges than the thickness of the tube wall, the depth of these widened parts, toward the roots of the teeth, being substantially less than the depths of the teeth.

2. A tubular saw in which the teeth are wider at their cutting edges than the thickness of the tube wall and decrease in width regularly toward the roots of the teeth, the depth of these widened parts, toward the roots of the teeth being substantially less than the depth of the teeth.

3. A tubular saw according to claim 1, in which the cutting edges are curved.

4. A tubular saw according to claim 2, in which the cutting edges are curved.

5. A tubular saw comprising a tube of hardenable material having the wall of one extremity thicker than the normal wall thickness of the remainder the tube, said thickened portion abruptly tapering down from the end of the tube to the normal thickness and regularly formed cutting teeth in the thickened portion, the roots of said teeth extending below said thickened portion into the wall of normal thickness.

EDWIN R. DOUGLAS.
ALEXANDER EDEL.
JOHN J. HEINS, JR.